Jan. 9, 1968   W. F. CARR ET AL   3,362,290
NON-CONTAMINATING THRUSTING SEPARATION SYSTEM
Filed April 13, 1965
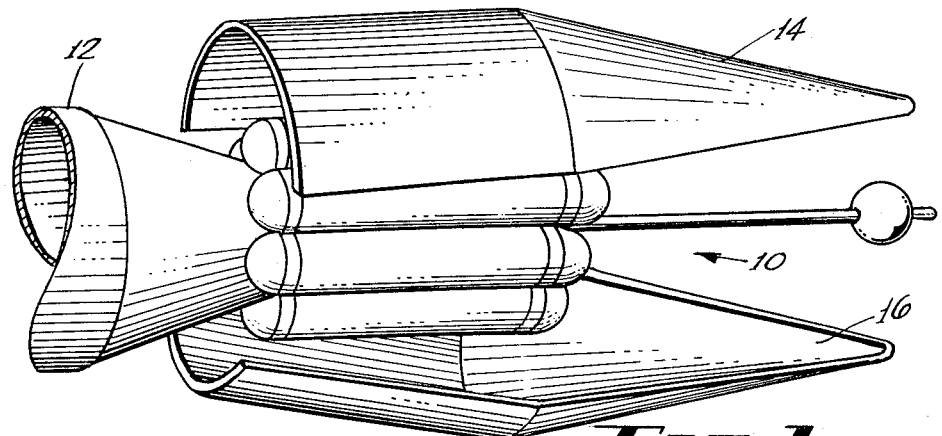
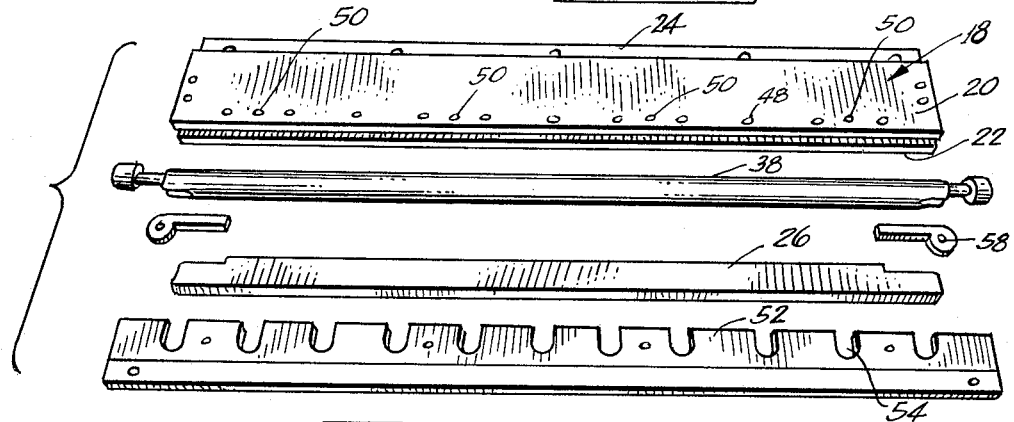
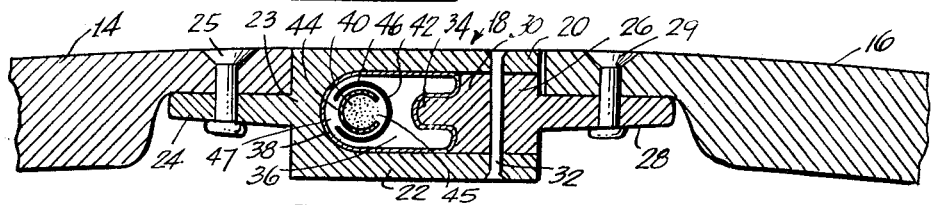
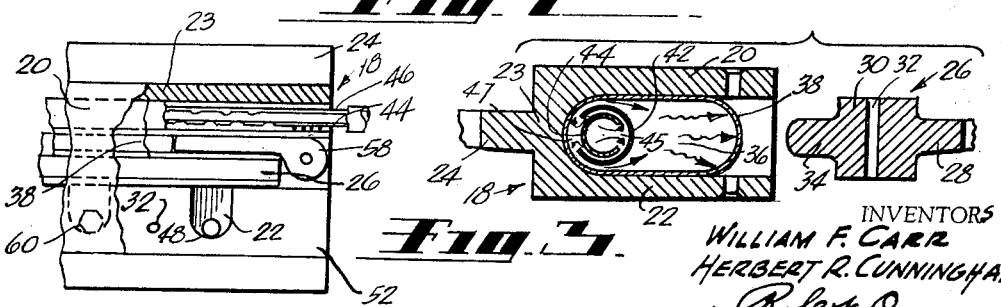
INVENTORS
WILLIAM F. CARR
HERBERT R. CUNNINGHAM
By Robert O. Richardson
ATTORNEY

United States Patent Office 3,362,290
Patented Jan. 9, 1968

3,362,290
NON-CONTAMINATING THRUSTING
SEPARATION SYSTEM
William F. Carr, Santa Monica, Calif., and Herbert R. Cunningham, Charlotte, N.C., assignors, by mesne assignments, to McDonnell Douglas Corporation, Santa Monica, Calif., a corporation of Maryland
Filed Apr. 13, 1965, Ser. No. 447,643
6 Claims. (Cl. 89—1)

The present invention relates to a non-contaminating thrusting separation system and more particularly, to a separation system which removes the fastenings between two units and imparts a thrust to separate the two units without contamination of the adjacent area.

There are many occasions when two units are made integral by a fastening device and a need arises for releasing the fastening device and separating the two units. For example, in an aircraft bearing externally mounted stores of cargo, auxiliary fuel tanks or warfare devices, there is a need to release them from the aircraft in such a manner that they will not damage either the device or the aircraft from which it is separated. Another example might be in the movie industry wherein it is desired to cause the collapse of huge storage tanks or other structures. Another example may be found in the space age, in the separation of boosters and propulsion mechanisms and apparatus from a space craft payload as it travels in outer space.

In many of the above uses of separation systems it is common practice to retain the two elements together with rivets or bolts that are sheared by explosives. When the severance is made with enough explosives, an additional thrust can be imparted to initiate the separation of the two units. The problems with explosives include that of high shock and low usable impulse. Most systems employs the high velocities of explosives to separate the fastener and springs to provide the required separation velocity. Another major problem is that of contamination of the adjacent area and particularly of delicate space craft instruments and other devices now used in space craft. The need for space craft sterilization on scientific extra-terrestrial operations requires complete non-contamination of the payload at the time of separation of the payload from the booster devices. Such materials that might contaminate and affect the mission or capabilities of the payload include loose pieces, fragments, explosive separation devices, and products of combustion.

The non-contaminating separation system of the present invention utilizes a novel separation joint for releasing two units made integral through such separation joint. The basic concept of this separation joint includes a piston-chamber combination with a linear explosive contained within and running the full length of the joint. The piston and chamber are held together with shear pin attachments. In an exemplary embodiment they are installed between the shell halves of a payload enclosure of an outer space vehicle. When the linear explosive is detonated, the rapidly expanding gas generated by the explosives reacts against the piston within the chamber, shearing the pins which hold the piston in place within the chamber, and producing the thrust necessary to separate the shell halves. This joint, employs a unique baffle-bellows assembly within the chamber which allows the system to be used unshielded in highly sensitive areas.

The construction of the system includes four basic components: a linear piston, that may be angular, straight, symmetrical, or irregular, assuming the contour of the separation plane: a flexible bellows to contain all contaminants emitted from the separation energy source, therein a baffle around the separation energy source to control and contain shock and to control the flow of gases into the bellows. The baffle consists primarily of a smaller tube inside a larger tube and these tubes contain gas metering and directing openings communicating with the bellows interior. Also, a chamber is provided which contains the piston, bellows, baffle and energy source. The operation commences with the generation of the expanding gases derived from explosives or other energy sources. The gases are metered at a controlled rate through the baffles into the bellows. The action of the expanding gases in the bellows provides thrust to the piston, enabling it to shear its retaining pins and move outwardly to affect the joint separation.

The bellows and baffle assembly within the chamber contains all contaminates of separation. The present system is non-contaminating and nonfragmenting. It provides for payload sealing, is reliable, provides predictable preparation forces, and is of light weight. It operates at all altitude conditions, and imparts low shock to the payload structure. For simplicity, the separation concept eliminates any external bands, latches, explosive bolts and spring actuators presently used on many separation devices now in use. This elimination in the present invention provides higher reliability less weight and increases the usable volume within the enclosure. Besides simplicity, the continuous sealing along the joint between the shells permits full monocoque load-carrying ability and provides a greater degree of contamination protection.

It is therefore an object of this invention to provide for a non-contaminating thrust separation system for the separation of connected units.

Another object of the provision of a separation system between two units utilizing an explosive, which retains the explosive contaminates within the system.

Another object is the provision of a reliable lightweight separation system that operates at all altitude conditions for releasing a propulsion system or protective housing from a payload structure.

Other objects will become more apparent as a description of the invention proceeds having reference to the drawings wherein FIGURE 1 is a pictorial representation of a payload being separated from its protective shroud; FIGURE 2 is a cross-sectional view showing the shrouds before separation; FIGURE 3 is a sectional view of the joint after separation; FIGURE 4 is an exploded view of a separation system assembly; and FIGURE 5 is a fragmentary view of one end of the assembled system.

Reference is now made to FIGURE 1, where there is shown a typical payload 10 propelled into space by means of booster 12 and protected by shroud sections 14, 16. At a pre-determined point in time and space, it is desirable to have the payload 10 in orbit, free from its protective shorud 14, 16. Not only should these sections be unlatched and permitted to fall away, but they also should be caused to separate in such a manner that the payload will not be subjected to accidental bumping by the sections. These sections should be ejected sufficiently far from the payload 10 so as to be free from any interference. Moreover, any force, causing this separation, must not contaminate the payload or cause injury to any of its delicate mechanisms. In this configuration in FIGURE 1 the separation joints of the present invention connect the two shroud sections 14, 16, and also may connect the shroud sections to the booster 12.

Reference is now made to FIGURE 2, which shows in cross-section the shroud sections 14, 16 before separation. Along the edge of shroud section 14, which is joined with shroud section 16, is a rectangular member 18, having an outer wall 20, and an inner wall 22, a bottom 23, and a connecting portion 24, which may be welded, riveted or bolted to the shroud section 14 in any desired manner. In this view rivet 25 and outer wall 20 are made flush with the outer surface of section 14. Shroud portion 16 has along its edge to be joined with shroud portion 14 a piston section 26 consisting of a connecting portion 28 welded, bonded, riveted or bolted to the shroud section 16 in any conventional manner, such as by rivet 29. The piston has a plunger portion 30, adapted to fit loosely within the walls 20, 22 of member 18. Inter-connecting shear pins 32 pass through suitable openings in the walls 20, 22 and the plunger portion 30 to retain the joint in the manner shown in FIGURE 2, before separation has been achieved. Plunger portion 30 has a protrusion 34 of a lesser width which extends down further into the cylinder rectangular member 18 for a purpose to be explained.

Plunger portion 30 with its protrusion 34 and walls 20 and 22 thus form a chamber 36 which is lined with a membrane or bellows 38. Within this bellows is placed an explosive 40 which, when ignited, causes rapidly expanding gases to fill chamber 36 under such pressure sufficient to cause plunger portion 30 to exert a shearing action with cylinder walls 20, 22. This action shears pins 32 and permits the enclosure shrouds 14, 16 to separate. A charge of explosive of sufficient size is provide to give the shrouds an ejection thrust and thus cause an effective separation.

As shown in FIGURE 3, the separation of shroud portions 14, 16 is affected upon the shearing of shear pin 32 and with the further expansion of the bellows 38 to fully expand chamber 36. It has been calculated that in this embodiment about 20% of the explosive charge causes the shearing of the shear pin 32 and 80% of the pressure due to the expansion gases cause the further separation of the shroud sections. As shown in FIGURE 2, protrusion 34 has depressed the bellows material to enable the plunger portion 30 of piston 26 to reduce chamber 36 to a minimum volume, shown in FIGURE 2 and, upon expansion of the gases and bellows to eject the piston, the bellows 38 assumes the form shown in FIGURE 3. The bellows must have a high tensile strength although it may be of low elasticity since there is little actual bellows expansion.

Because of the high initial force of the explosive charge 40 and the likelihood of its causing a rupture in the bellows 38, the charge is placed in a baffle 42 which consists of an inner tube 44 and an outer tube 46. Inner tube 44 has openings 45 therein facing in a direction toward the protrusion 34, whereas tube 46 has openings 47 therein facing the bottom of the chamber 36. In this manner, the rapidly expanding gases initiating from the explosive 40 rapidly expand chamber 36, yet the explosive debris is contained within the tubes, 44, 46, within the baffle 42, thereby diminishing the liklihood of rupture of the bellows 38. The flow of the gases upon the explosive discharge is shown by the arrows in FIGURE 3.

FIGURE 4 shows an assembly of parts to be mounted along the longitudinal edges of the shroud half sections 14 and 16. Here there is shown the elongated rectangular member 18 with walls 20 and 22 having apertures 48 therein. These are to accommodate bolts 60 (in FIGURE 5) extending through the walls for reinforcement and to resist the pressure of the explosive charge. It has been found that the use of these bolts near the leading edges of the walls are preferable to the making of thicker, heavier and more rigid chamber walls. Rectangular member 18 also has shear pin apertures 50 for securing a thruster section 52 to the chamber. Because of the wall interconnecting bolts, the thruster section 52 and piston 26 are cooperatively combined to effect the separation. Rectangular member 18 will be affixed to one of the sections, for example sections 14 and thruster section 52 will be secured to the other, section 16. Bellows 38, which is sealed at both ends, is adapted to fit within the chamber defined by the walls 20, 22. Because of the bolts 60 to be inserted in bolt holes 48, piston 26 is not attached to the thruster 52 but is inserted within the chamber walls 20, 22 before the bolts 60 are inserted. The piston 26, upon actuation, will then urge thruster 52 away from the rectangular member 18. Thruster 52 has cut-out portions 54 so that it might be fitted down into chamber walls of rectangular member 18 to abut against the piston 26. Piston 26 is held in abutting relationship to the thruster 52 by means of supports 58, which are pivotally mounted to rectangular member 18.

FIGURE 5 shows the apparatus in FIGURE 4 in assembled condition, with parts broken away for a better illustration of their relationship. Here bolt 60 extends through the apertures 48 in walls 20, 22 of member 18. Thruster 52 has been inserted between the walls and held in position by shear pins 32. Piston 26 abuts thruster 52 and is held in this relationship by support 58 which has been pivotally mounted to the chamber walls 20–22.

By way of example only and without intention of being limited thereto, it has been found that the preferred explosive to be used as charge 40 is the commercially available Ensign-Bickford "Prima-line," which is a four grain-per-foot PETN (Pentaerythritete Trinitrate) composition having an average shearing pressure of 627 p.s.i. and an average thrusting pressure of 352 p.s.i. These pressures are suitable for the instant application. The explosive is contained in a waterproofed textile cover which is not susceptible to kinks and breakage. It has no cover particles to be ejected with possible damage to the bellows.

The baffle tubes may be of polyurethene, teflon, neoprene, gum rubber, or similar material whereas Du Pont No. 5810 Fairprene coated fabric was found to be the best material for the bellows 38. This material is a glass fabric coated with silicone rubber and is approximately 0.032 inch thick. It has a high tensile strength (grab) of $300 \times 250$ lbs./in. ($W \times F$) and a burst strength (Mullens) of 500 p.s.i. The piston and rectangular member may be made of any suitable plastic composition or metal having the required strength for the desired application.

From the foregoing description it is obvious that further modification and improvements will occur to those skilled in the art and it is to be understood that such variations are to be included as part of this invention when coming within the scope of the appended claims.

What is claimed is:

1. A non-contaminating thrust separation system for the separation of two units joined together, said system comprising:

an elongated member having a recess in one of the sides thereof forming a chamber parallel with the longitudinal axis of said member;

said chamber having a bottom and side walls, the bottom of said chamber extending along the abutting edge of said units and fastened to the first of said units and being lined with a membrane;

a piston section extending along and connected to the other of said units and adapted to fit within and substantially conform to said chamber;

a baffle within said chamber, said baffle having gas expanding means therein for generating thrust to propel said piston section out of said chamber, said embrane serving to retain expanding gas within said chamber.

2. A non-contaminating thrusting separation system for separating two units joined together, said system comprising:

an elongated rectangular member having a recess in one of the sides thereof thereby forming a chamber parallel with the longitudinal axis of said rectangular member;

said member being attached to one unit and a corresponding piston attached to the other of said units, said piston fitting within said chamber;

a closed and sealed bellows fitting within said chamber and adapted to expand the volume therein as said piston is moved out of said chamber; and a baffle within said chamber having a source therein for generating expanding gases to cause said piston ejection.

3. A non-contaminating thrusting separation system for separating two units comprising:

an elongated rectangular member having a recess in one of the sides thereof thereby forming a chamber parallel with the longitudinal axis of said rectangular member;

a piston adapted to extend along and be connected to the edge of a second unit;

said piston adapted to fit within said chamber when said units are in abutting relationship;

means for generating rapidly expanding gases within said chamber to thus eject said piston from said chamber;

a bellows within said chamber for containing said rapidly expanding gases;

a baffle within said bellows containing said means therein;

said baffle having gas-escaping openings permitting said gases to escape therefrom;

retention means for retaining said piston within said chamber until the pressure of said expanding gases builds up beyond a predetermined pressure;

said piston having a protrusion thereon for reducing the volume of said chamber below the maximum volume of said bellows whereby expansion of said chamber due to ejection of said piston will not cause said bellows to burst.

4. A non-contaminating thrusting separation system for separating two units comprising:

an elongated member having a recess therein defining a chamber parallel with the longitudinal axis of said member, said chamber having a bottom and side walls, the bottom of of said chamber being attached along the edge of a first unit;

a piston connected along the edge of a second unit, said piston adapted to fit within said chamber;

means constituting a source for rapidly expanding gases within the chamber to thus eject said piston from said chamber;

a bellows within said chamber for containing said rapidly expanding gases and their source;

a baffle consisting of a larger tube and a smaller tube;

said source being within said smaller tube, both of said tubes having orifices therein whereby gases emanating from within said smaller tube may escape into said chamber and thus cause the ejection of said piston.

5. A non-contaminating thrusting separation system for separating two units comprising:

an elongated rectangular member having a recess in one of the sides thereof thereby forming a chamber parallel with the longitudinal axis of said rectangular member;

said chamber having a pair of walls and a bottom to define said recess;

reinforcing means across said recess to interconnect said walls near the edges thereof;

piston means adapted to fit within said recess and adapted for outward movement;

a thruster section secured to the other of said units and extending downwardly into said chamber to abut said piston means, said thruster section having cut-out portions to permit penetration of said section into said chamber beyond said reinforcing means;

shear pins interconnecting said thruster section and the walls of said chamber to thereby retain said units in fixed relative relationship and to retain said thruster section in abutting contact with said piston in said chamber; and rapidly expanding gas means within the chamber for exerting pressure on said piston to thereby break said shear pins to thus eject said thruster section from said chamber and cause separation of said units.

6. A non-contaminating thrusting separation system for separating two units comprising:

an elongated rectangular member having a recess in one of the sides thereof therby forming a chamber parallel with the longitudinal axis of said rectangular member;

said chamber having a bottom and spaced walls with retaining means thereacross;

piston means within said chamber, said piston means being positioned between said bottom and said reinforcing means;

a source of rapidly expanding gases within said chamber for exerting pressure against said piston;

piston contact means engageable with other of said units, said piston contact means protruding into said chamber beyond said reinforcing means to abut against said piston for actuation thereby;

shielding means within said chamber to contain said source of rapidly expanding gases; and baffle means to prevent puncture of said shielding means by said source of rapidly expanding gases.

References Cited

UNITED STATES PATENTS

| | | | |
|---|---|---|---|
| 2,565,352 | 8/1951 | Champney | 102—90 |
| 2,996,985 | 8/1961 | Kratzer | 102—495 X |
| 3,106,131 | 10/1963 | Barr et al. | 89—1.01 |
| 3,119,298 | 1/1964 | Brown | 89—1.01 X |
| 3,119,302 | 1/1964 | Barr | 89—1.01 |

SAMUEL W. ENGLE, *Primary Examiner.*

BENJAMIN A. BORCHELT, *Examiner.*